United States Patent
Chen et al.

(10) Patent No.: US 11,500,943 B2
(45) Date of Patent: *Nov. 15, 2022

(54) METHOD AND SYSTEM FOR CACHED EARLY-BINDING DOCUMENT SEARCH

(71) Applicant: EMC IP Holding Company LLC, Hopkinton, MA (US)

(72) Inventors: Chao Chen, Shanghai (CN); Jingjing Liu, Shanghai (CN); Lei Zhang, Shanghai (CN); Kunwu Huang, Shanghai (CN); Hongtao Dai, Shanghai (CN); Ying Teng, Pleasanton, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/686,092

(22) Filed: Nov. 15, 2019

(65) Prior Publication Data
US 2020/0081925 A1  Mar. 12, 2020

Related U.S. Application Data

(63) Continuation of application No. 15/279,946, filed on Sep. 29, 2016, now Pat. No. 10,606,902.

(51) Int. Cl.
*G06F 7/00* (2006.01)
*G06F 16/00* (2019.01)
(Continued)

(52) U.S. Cl.
CPC .......... *G06F 16/93* (2019.01); *G06F 16/2237* (2019.01); *G06F 16/24552* (2019.01); *G06F 21/6218* (2013.01)

(58) Field of Classification Search
None
See application file for complete search history.

(56) References Cited

U.S. PATENT DOCUMENTS

| 7,921,288 B1 | 4/2011 | Hildebrand |
| 8,402,514 B1 | 3/2013 | Thompson et al. |

(Continued)

OTHER PUBLICATIONS

"Access Control Caching"; Websphere Portal Express 8.5.0; Aug. 1, 2006; http://www.ibm.com/support/knowledgecenter/en/SSYJ99_8.5.0/admin-system/acc_control_cache.html.
(Continued)

*Primary Examiner* — Tuan A Pham
(74) *Attorney, Agent, or Firm* — Chamberlain, Hrdlicka, White, Williams & Augtry

(57) ABSTRACT

A method for servicing document search requests. The method includes receiving, by a document management service, a document search query from a requesting user, and injecting, into the document search query, a user access vector. The user access vector specifies, for the requesting user, access control lists that are associated with the requesting user. The method further includes identifying, in a document repository, documents that match the document search query with the injected user access vector. A matching document requires a match of terms in the search query with terms in the matching document, and a match of at least one access control list specified in the matching document and at least one of the access control lists specified in the user access vector.

11 Claims, 15 Drawing Sheets

(51) Int. Cl.
*G06F 16/93* (2019.01)
*G06F 16/2455* (2019.01)
*G06F 21/62* (2013.01)
*G06F 16/22* (2019.01)

(56) References Cited

U.S. PATENT DOCUMENTS

| | | |
|---|---|---|
| 9,614,854 B2 | 4/2017 | Obbard |
| 2006/0041558 A1 | 2/2006 | McCauley et al. |
| 2006/0235850 A1* | 10/2006 | Hazelwood ......... H04L 61/1523 |
| | | 707/999.009 |
| 2006/0282900 A1* | 12/2006 | Johnson ................ G06F 21/604 |
| | | 726/26 |
| 2007/0016583 A1 | 1/2007 | Lempel et al. |
| 2007/0294236 A1 | 12/2007 | Vaughan et al. |
| 2008/0172390 A1 | 7/2008 | Zeller et al. |
| 2011/0093471 A1 | 4/2011 | Brockway et al. |
| 2011/0179075 A1 | 7/2011 | Kikuchi et al. |
| 2012/0278903 A1* | 11/2012 | Pugh ................... G06F 21/6218 |
| | | 726/28 |
| 2013/0212707 A1* | 8/2013 | Donahue ................. H04L 63/10 |
| | | 726/29 |
| 2014/0059699 A1 | 2/2014 | Tewksbary et al. |
| 2016/0055248 A1* | 2/2016 | Goel ..................... G06F 16/219 |
| | | 707/770 |
| 2016/0098405 A1 | 4/2016 | Gorbansky et al. |

OTHER PUBLICATIONS

"IBM Web Cache Manager Shortens Internet Access Times"; Sep. 29, 1998; http://www-03.ibm.com/press/us/en/pressrelease/2454wss.

* cited by examiner

| User Name | Access Control List |
|---|---|
| userA | acl1, acl2, acl3, ... |
| userB | acl2, acl3, acl4, ... |
| userC | acl2, acl5, acl6, ... |

| User Name | Groups |
|---|---|
| userA | groupA |
| userB | groupA, groupB |
| userC | groupC | ures.
METHOD AND SYSTEM FOR CACHED EARLY-BINDING DOCUMENT SEARCH

BACKGROUND

A significant amount of content is stored in document repositories. The access and manipulation of this content is typically restricted using various types of access control mechanisms. In conventional systems, accessing content in a content repository may be a two-stage process. In the first stage, all documents matching a query issued by a user may be obtained. In a second stage, access control mechanisms may be applied to the retrieved documents in order to identify only the documents that the user is permitted to access. This limited set of documents is then provided to the user. This two-stage process introduces a significant amount of latency in the retrieval of content from the document repositories.

DETAILED DESCRIPTION

Figure 1:
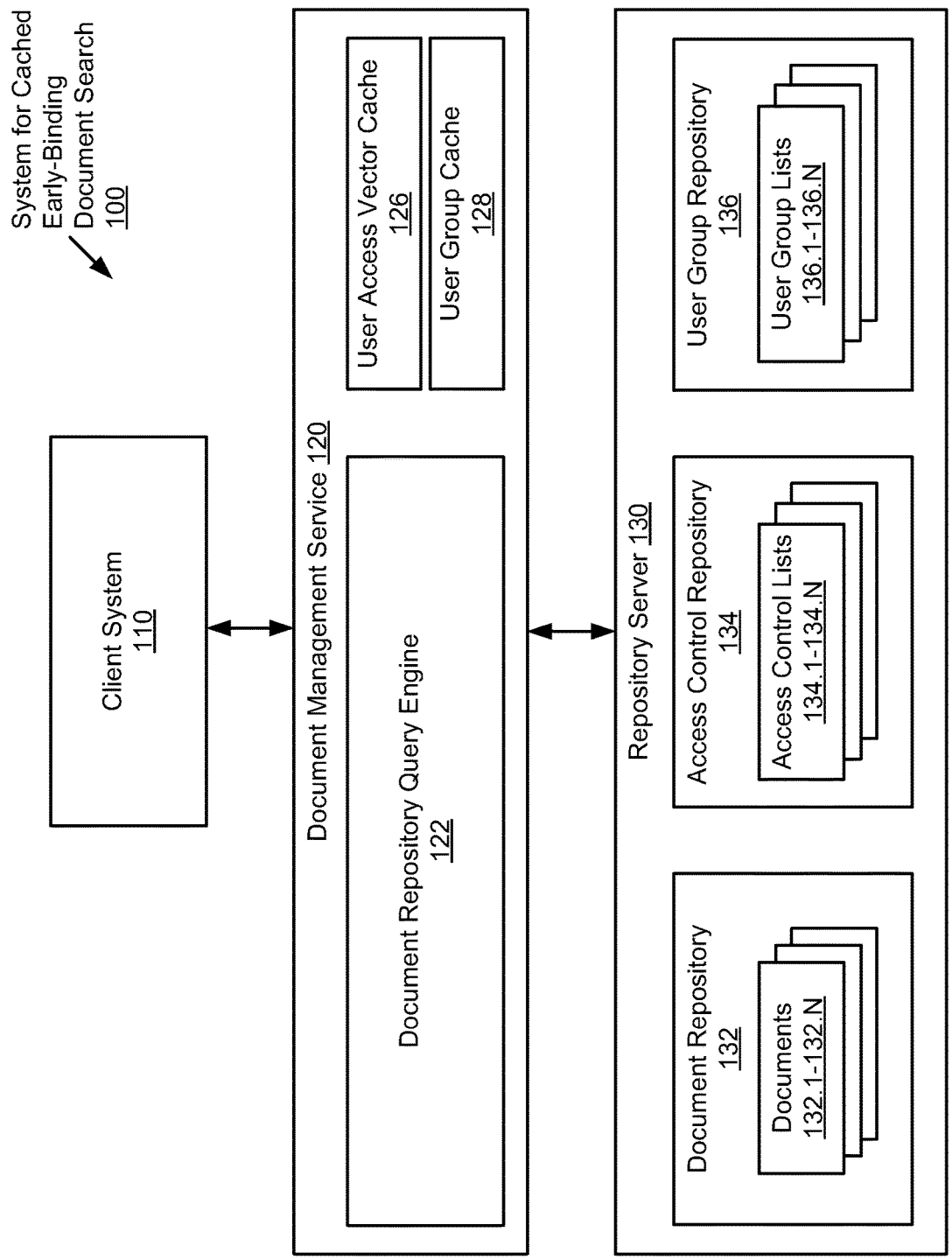
FIG. 1 shows an exemplary system for cached document search, in accordance with one or more embodiments of the technology.

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-10 any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system that rely on user access vectors to service queries to document repositories. More specifically, embodiments of the technology relate to improving performance, decreasing latencies, and/or avoiding timeouts in servicing queries to document repositories by modifying incoming queries, e.g., queries for documents, submitted by users, to include user access vectors. A user access vector may specify a document-requesting user's permissions for accessing documents. For example, a user access vector may specify, for the requesting user, the access control lists that are associated with the user, such that any document that requires an access control list that is associated with the user is considered to be accessible by the user, whereas other documents that require access control lists that are not associated with the user are considered to be non-accessible by the user. In this manner, only documents that the requesting user is authorized to access, based on the user access vector, may be obtained from the document repository. The documents that the requesting user is permitted to access may be obtained from the document repository in a single stage instead of first returning all documents that satisfy the query (regardless of whether the user is actually permitted to access these documents) and then applying the access control mechanisms to the set of obtained documents. Changes to the user base that is allowed to access documents may be made without requiring the re-indexing of the documents in the document repository.

FIG. 1 shows an exemplary system for cached early-binding document search, in accordance with one or more embodiments of the technology. The system includes a client system (110) (or multiple client systems), a document management service (120), and a repository server (130). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system (110) corresponds to any computing system (see e.g., FIG. 10) that includes functionality to issue document search requests (also referred to as queries) to the document management service (120) and to receive a corresponding response(s) from the document management service after the request has been serviced.

Continuing with the discussion of FIG. 1, the document management service (120) includes functionality to perform all or a portion of the methods shown in FIGS. 2-7E. The document management service may also include functionality to perform various actions (e.g., read, write, delete, modify, send, etc.) on the objects stored in the document repository (132) the access control repository (134) and/or the user group repository (136), when servicing requests from the client system and/or requests issued by another party, e.g., an administrator. The document management service may be implemented using one or more computing systems (see e.g., FIG. 10).

The document management service, in accordance with one or more embodiments of the technology, includes a document repository query engine (122), a user access vector cache (126) and a user group cache (128).

The document repository query engine (122), in accordance with one or more embodiments of the technology, identifies documents, in the document repository, that match a user-specified search query. The document repository query engine (122) further determines whether the requesting user is authorized to access the identified documents. Only documents that the user is authorized to access are returned to the requesting user. The document repository query engine (122) thus interfaces with the document repository (132) and performs at least some of the steps described in FIGS. 2-7E. Any kind of indexed or non-indexed document search may be performed, without departing from the technology.

The document repository query engine, in accordance with an embodiment of the technology, makes a determination regarding whether the requesting user is permitted to access a document based on information provided in the user access vector, as part of the query. The user access vector may specify, for example, access control lists 1, 2 and 3 as associated with the requesting user. An access control list may be specified, for example, using the access control list's name, or any other type of identifier. The document repository query engine may then return a document obtained from the document repository to the requesting user, if one of the access control lists in the user access vector matches the access control list specified by the document. For example, in the above scenario, a document that specifies access control list 2 may be returned to the requesting user, whereas another document that requires an access control list 4 may not be returned to the requesting user.

The user access vector, in accordance with an embodiment of the technology, is specific to the requesting user. In other words, a user access vector for a requesting user A may be different from a user access vector for a requesting user B. Accordingly, the user access vector may need to be constructed in a user specific manner, when a search request is submitted by the user. The construction of the user access vector from data obtained from the access control repository (134) and/or from the user group repository (136) is discussed below with reference to FIGS. 2-7E. In one embodiment of the technology, the user access vector is constructed from data that is cached in the user access vector cache (126) and/or the user group cache (128), to reduce the need for time and bandwidth intense queries of the access control repository (134) and/or the user group repository (136), as data in the user access vector cache (126) and/or the user group cache (128) may be used/reused across multiple search instances. The document repository query engine, in one or more embodiments of the technology, generates the user access vector cache (126) and the user group cache (128) from the access control repository (134) and the user group repository (136), as subsequently described with reference to FIGS. 2-7E.

Figures 8A, 8B:
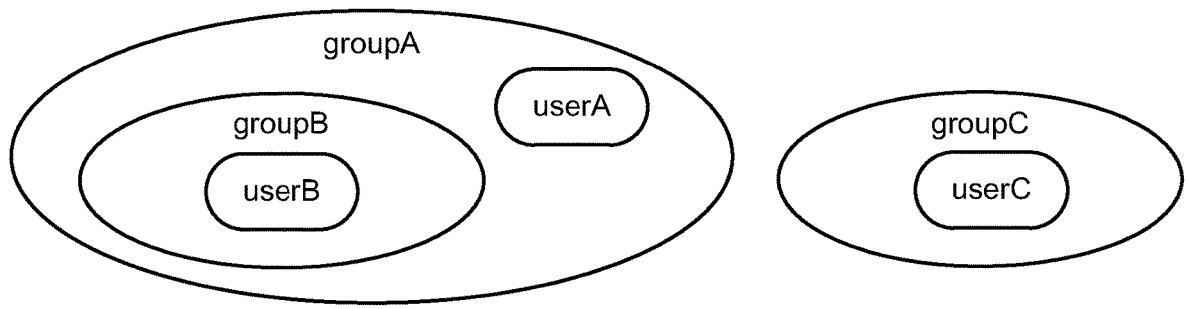
FIG. 8A shows an exemplary user access vector cache, in accordance with one or more embodiments of the technology.
FIG. 8B shows an exemplary user group cache, in accordance with one or more embodiments of the technology.

In one or more embodiments of the technology, the document management service (120) includes the user access vector cache (126) and the user group cache (128). The user access vector cache (126) may include a collection of user access vectors, as illustrated in the exemplary user access vector cache of FIG. 8A. While FIG. 8A shows an exemplary user access vector cache, those skilled in the art will appreciate that the format of the user access vector cache may deviate from the exemplary user access vector cache of FIG. 8A, without departing from the technology.

Having the user access vectors locally available in a cache located in the document management service (120) may accelerate search operations because fewer time and bandwidth-consuming communications with the repository server (130) are required when obtaining a user's access permissions.

In one embodiment of the technology, the user access vector cache is populated using content in the access control repository (134) and the user group repository (136), as described below with reference to FIGS. 2-7E.

The user group cache (128), in accordance with one or more embodiments of the technology stores group memberships of users. For example, the user group cache (128) may establish that user B is a member of user groups A and B. Such group membership may be relevant when determining user privileges because user groups may have various privileges, and users that are members of groups may inherit privileges from these groups. The user group cache (128) may be used to derive the user access vector cache (126), as described below.

In one embodiment of the technology, the user group cache is populated using content in the user group repository (134), as described below with reference to FIGS. 2-7E. An exemplary user group cache is shown in FIG. 8B. Those skilled in the art will appreciate that the format of the user group cache may deviate from the exemplary user group cache of FIG. 8B, without departing from the technology.

Continuing with the discussion of FIG. 1, the repository server (130), includes functionality to store documents in a document repository (132), to store access control information in an access control repository (134) and to store user group information in a user group repository (136). These repositories (132-136) may be hosted on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM), a redundant array of independent disks (RAID), network attached storage (NAS), cloud storage, etc. Further, at least some of the content in the repositories (132-136) may alternatively or in addition be stored in volatile memory, e.g., Dynamic Random-Access Memory (DRAM), Synchronous DRAM, SDR SDRAM, and DDR SDRAM.

The document repository (132), the access control repository (134) and/or the user group repository (136) may be implemented using any format suitable for the storage of the corresponding entries in these repositories. One or more of these repositories may be, for example, a collection of text or binary files, spreadsheets, SQL databases etc. or any other type of hierarchical, relational and/or object oriented collection of data.

The document repository (132), in accordance with an embodiment of the technology, hosts a collection of documents (132.1-132.N) that may be searched upon request by a user. The documents in the document repository may include any type of content and may be text documents encoded in various formats, or hybrid documents including text content in combination with other, non-text content. In one embodiment of the technology, the documents in the document repository are indexed to facilitate and/or accelerate the search for documents. The resulting indexing data may be stored in the document repository or in a separate repository, without departing from the technology.

In one embodiment of the technology, an access control list is specified for each document in the document repository (132). Only users that are a member of this access control list may access the document. The access control list may be specified, for example by naming the access control list either in the document itself, or alternatively elsewhere, e.g. in a separate document or database used for tracking the assignment of access control lists to documents.

The access control repository (134), in accordance with an embodiment of the technology, hosts a collection of access control lists (134.1-134.N). Each of the access control lists may specify users, such that these users may access a document that names the access control list. In one embodiment of the technology, an access control list may further specify user groups that are authorized to access a document. In conjunction with the user group repository (136), the users that are members of the user groups may be identified as users that are thus authorized to access a document. Access control lists may come in different formats and may include additional details beyond named users. For example, access control lists may also specify the degree of access being granted, such that, for example, a user A, named in an access control list, is authorized to perform read operations only, whereas a user B, also named in the access control list, is authorized to also perform write operations. Multiple/many access control lists may be stored in an access control repository. For example, a separate access control list may exist for each document in the document repository, if each document in the document repository names a different access control list. Alternatively, an access control list may apply to multiple documents in the document repository, if multiple documents in the document repository name the same access control list.

Continuing with the discussion of the system (100), the user group repository (136), in accordance with an embodiment of the technology, includes user group lists (136.1-136.N) that establish a grouping of users in user groups. A group of users may include a set of users and/or other groups of users. Accordingly, groupings of users may be established in the user group repository in one or more hierarchical levels. The hierarchical levels may include groups, parent groups, etc. For each of these user groups, one or more access control lists (134.1-134.N) may include an entry that establishes the permission level of the user group. Accordingly, the user group lists in the user group repository enables the assignment of permission levels to users, without specifying a permission level for each individual user. An individual user group list may specify one or more groups, e.g., by the names of these groups. For each group, the members of the group are specified. A member may be another group or a user. A group may contain any number of members. User group lists may be provided in various formats such as text documents or spreadsheets, or may be organized in any kind of database.

The technology is not limited to the architecture of the system (100) shown in FIG. 1. Specifically, although FIG. 1 shows a single repository server (130), a single document repository (132), a single access control repository (134) and a single user group repository (136), those skilled in the art will appreciate that one or more of these elements may be distributed over multiple repositories, and that the repositories may be local and/or remote. Further, the system (100) may include any number of client systems (110).

FIGS. 2-7E show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

Figure 2:
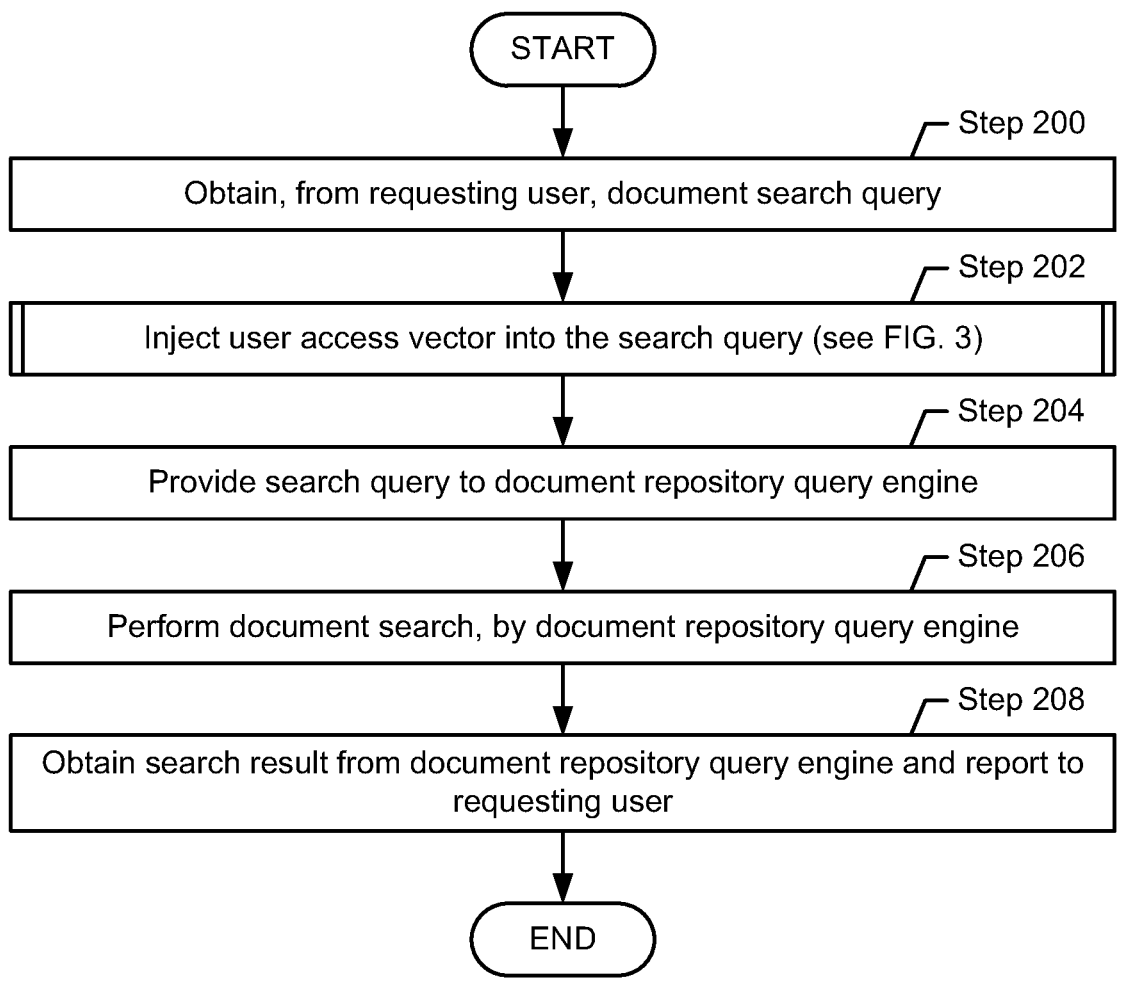
FIG. 2 shows a method for performing a document search, in accordance with one or more embodiments of the technology.

FIG. 2 shows a method for performing a document search, in accordance with one or more embodiments of the technology. The method may be executed once a user submits a search query via the client system. Depending on how many documents in the document repository match the search query and are deemed accessible by the requesting user, any number of documents may be returned to the user.

Turning to FIG. 2, in Step 200, a document search query is obtained from the requesting user, e.g., via the client system. The search query may be submitted in any form that enables the system for cached document search to identify, in the document repository, documents that match the search query. The search query, in accordance with an embodiment of the technology, includes search terms (e.g., individual words, sentences, paragraphs, etc.) that are to be located in the documents that are stored in the document repository.

In Step 202, a user access vector is injected into the search query. As previously described, the user access vector, in accordance with one or more embodiments of the technology, specifies access control lists in which the user is registered. If the user access vector includes an extensively large number of access control lists, separate user access vectors may be generated to distribute the access control lists. In such a scenario, the subsequent steps may be performed separately for the different user access vectors. A detailed description of Step 202 is provided below in FIG. 3.

In Step 204, the search query with the injected user access vector is provided to the document repository query engine, and in Step 206, the document repository query engine, in accordance with an embodiment of the technology, locates documents, in the document repository, that match the search query. Only document for which the specified access control list matches at least one of the access control lists in the user access vector are considered.

In Step 208, the search result, generated by the document repository query engine is reported to the requesting user. In other words, the documents identified by the document repository query engine are returned to the requesting user via the client system.

Figure 3:
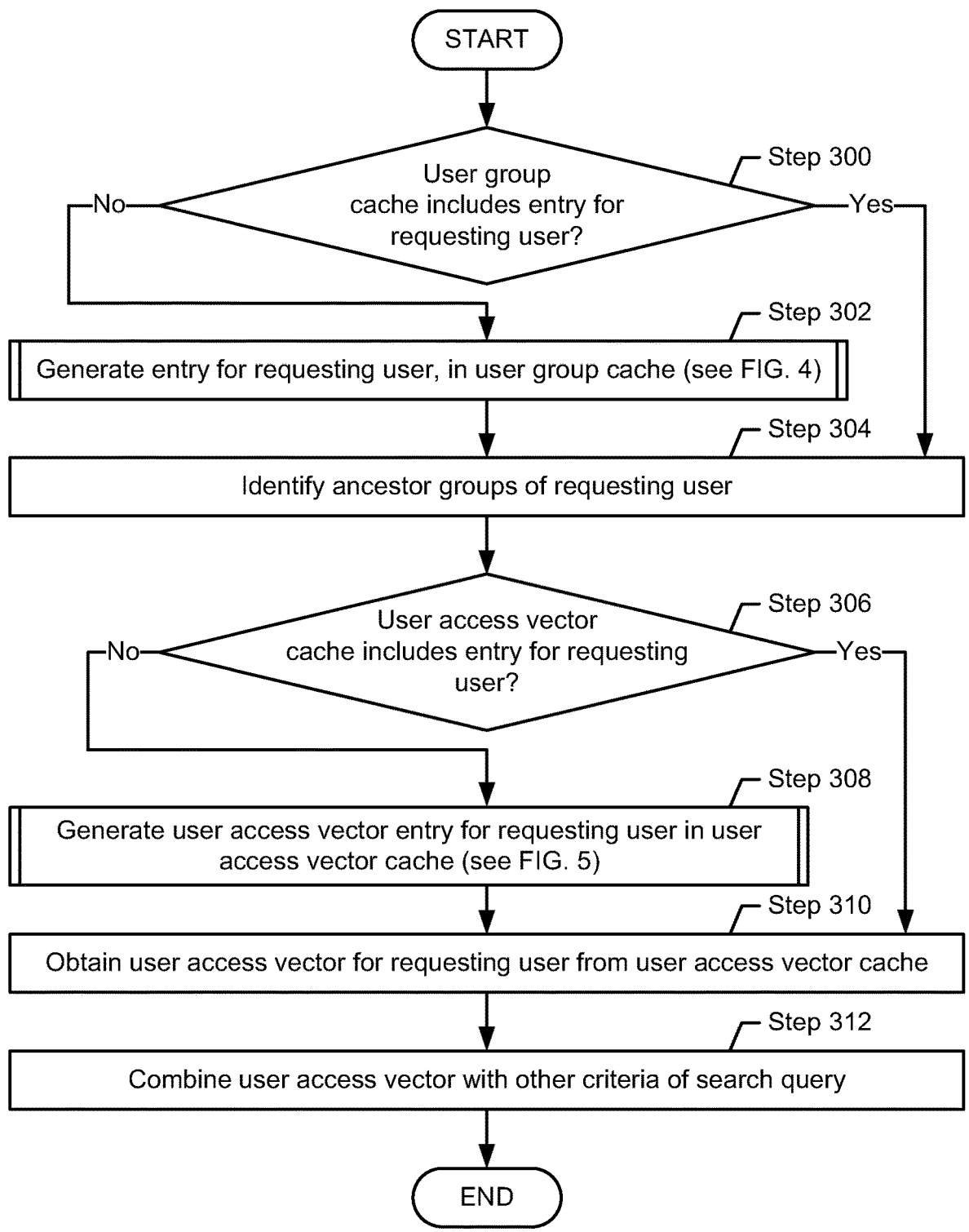
FIG. 3 shows a method for generating a user access vector, in accordance with one or more embodiments of the technology.

FIG. 3 shows a method for generating a user access vector for the requesting user, in accordance with one or more embodiments of the technology. The user access vector may be generated as a search is requested by a user.

Turning to FIG. 3, in Step 300, a determination is made about whether the user group cache includes an entry for the requesting user, including e.g. the requesting user's ancestor groups. Ancestor groups may be documented in a group entry in the user group cache as illustrated, for example, in FIG. 8B. If a determination is made that no user group entry exists, the method may proceed to Step 302. If a user group entry exists, the method may proceed to Step 304.

In Step 302, an entry is generated in the user group cache, for the requesting user. The details are provided below, with reference to FIG. 4.

In Step 304, the ancestor groups for the requesting user are obtained from the user group cache. Any number of ancestor groups found in the user group cache for the requesting user may be reported. If the requesting user is not a member of a group, no ancestor groups may be reported.

In Step 306, a determination is made about whether the user access vector cache includes an entry for the requesting user. If a determination is made that no entry exists for the requesting user, the method may proceed to Step 308. Otherwise, the method may proceed to Step 310.

In Step 308, a user access vector is generated for the requesting user in the user access vector cache. The details are provided below, with reference to FIG. 5.

In Step 310, the user access vector for the requesting user is obtained from the user access vector cache. In Step 312, the user access vector is injected into the search query by combining the user access vector with the other search criteria, e.g., search terms such as individual words, sentences, paragraphs, etc.

Figure 4:
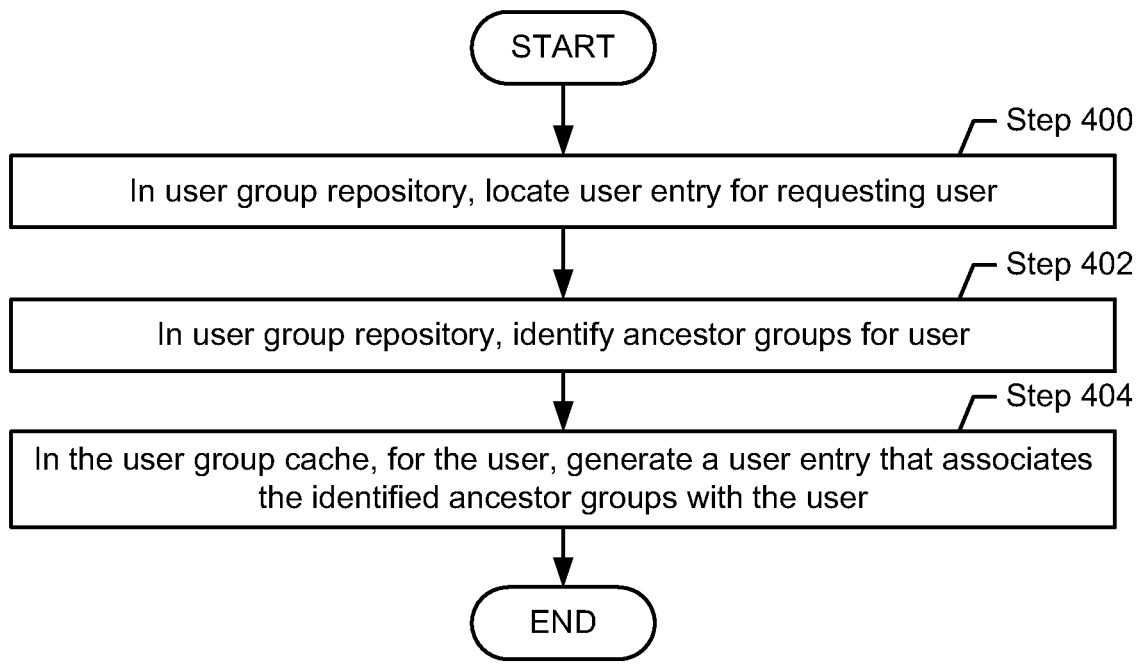
FIG. 4 shows a method for adding an entry for a document-requesting user to a user group cache, in accordance with one or more embodiments of the technology.

FIG. 4 shows a method for adding an entry, for the requesting user, to the user group cache, in accordance with one or more embodiments of the technology.

Turning to FIG. 4, in Step 400, the user entry for the requesting user is located in one or more of the user group lists in the user group repository. A single user entry, multiple user entries, or no user entry may be found. In Step 402, for the located user entries, all ancestor groups are identified. The identification of ancestor groups may require multiple iterations of parsing the user group repository for ancestor groups. For example, for a user A, it may first be determined that user A is a member of group A. Next it may be determined that group A is a member of group B, etc. A user may be a member of any number of groups, and a group may also be a member of any number of other groups.

In Step 404, an entry is made in the user group cache, for the user, based on the information obtained in Step 402. The entry may include all ancestor groups identified in Step 402. In the above example, an entry for user A would be made, that indicates that user A is a member of groups A and B.

Figure 5:
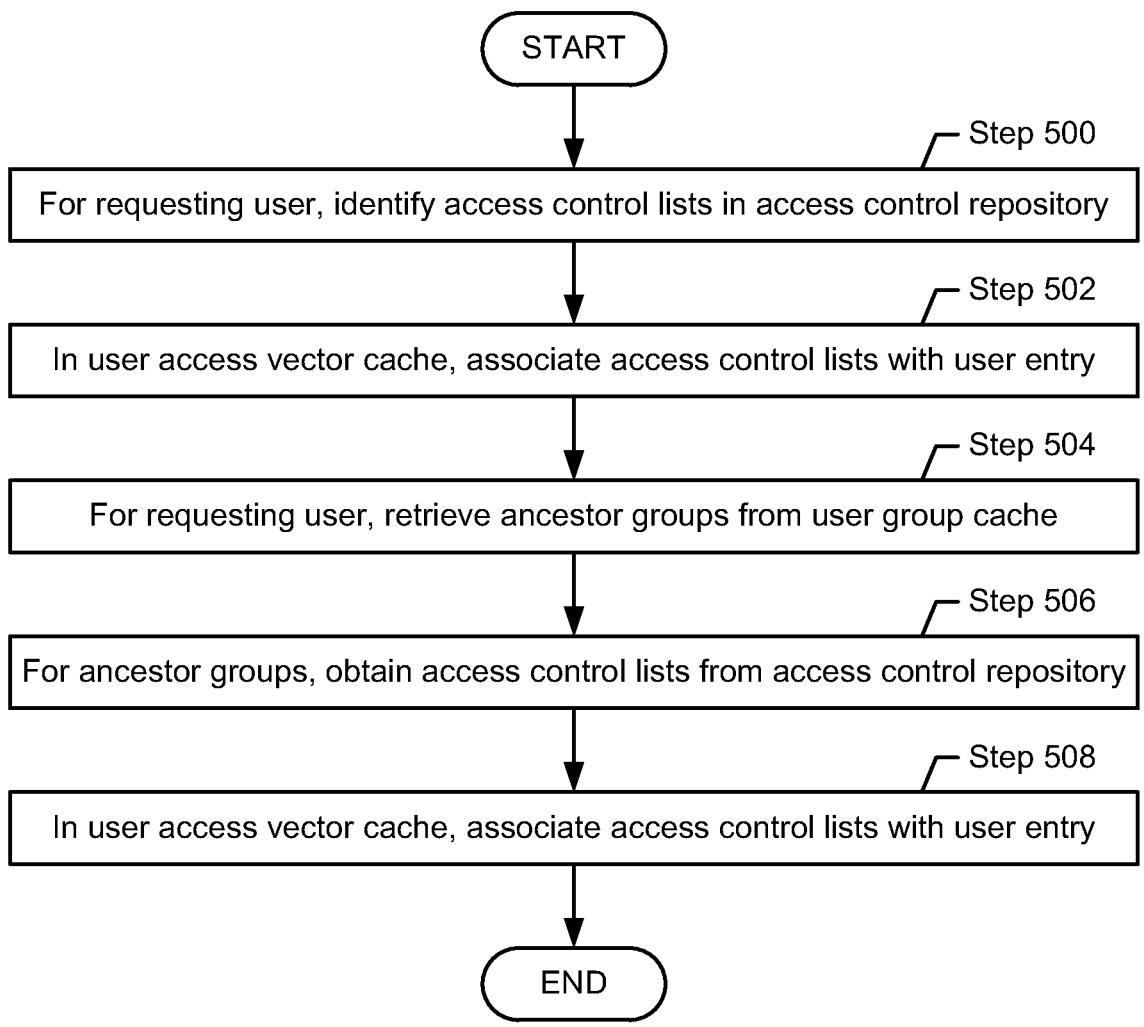
FIG. 5 shows a method for generating an entry for the document-requesting user in a user access vector cache, in accordance with one or more embodiments of the technology.

FIG. 5 shows a method for generating an entry in the user access vector cache, in accordance with one or more embodiments of the technology. More specifically, each access control list in the access control repository that is found to include either the user him/herself or an ancestor group of the user (i.e., a group that the user is a member of, either directly (e.g., a parent group), or indirectly through inheritance (e.g., a grandparent group)) is added to the user access vector cache, as subsequently described. Repeated execution of the method for different requesting users may, over time, result in a comprehensive user access vector cache that includes data for multiple/many requesting users, such that queries by requesting users may be handled without requiring accessing the access control repository and/or the user group repository on the repository server.

Turning to FIG. 5, in Step 500, access control lists that include the requesting user are identified in the access control repository. Identifying these access control lists may require parsing the access control list for the requesting user's name. Any number of access control lists may be identified.

In Step 502, the identified access control lists are associated with the user entry for the requesting user, in the user access vector cache. An exemplary user access vector cache in which access control lists are associated with users is shown in FIG. 8A. After execution of Steps 500 and 502, all access control lists in the access control repository, in which the user him/herself is registered, may have been added to the user access vector cache.

In Step 504, the ancestor groups are obtained from the user group cache, for the requesting user. In Step 506, for the obtained ancestor groups, the access control lists are obtained from the access control repository. Identifying these access control lists may require parsing the access control lists for the ancestor groups' names. Any number of access control lists may be identified. In Step 508, the identified access control lists are associated with the user entry for the requesting user, in the user access vector cache. After execution of Steps 504-508, all access control lists in the access control repository, in which the user is indirectly registered by being a member of an ancestor group (e.g. a parent or grandparent) that is included in these access control lists, may have been added to the user access vector cache.

Figure 6:
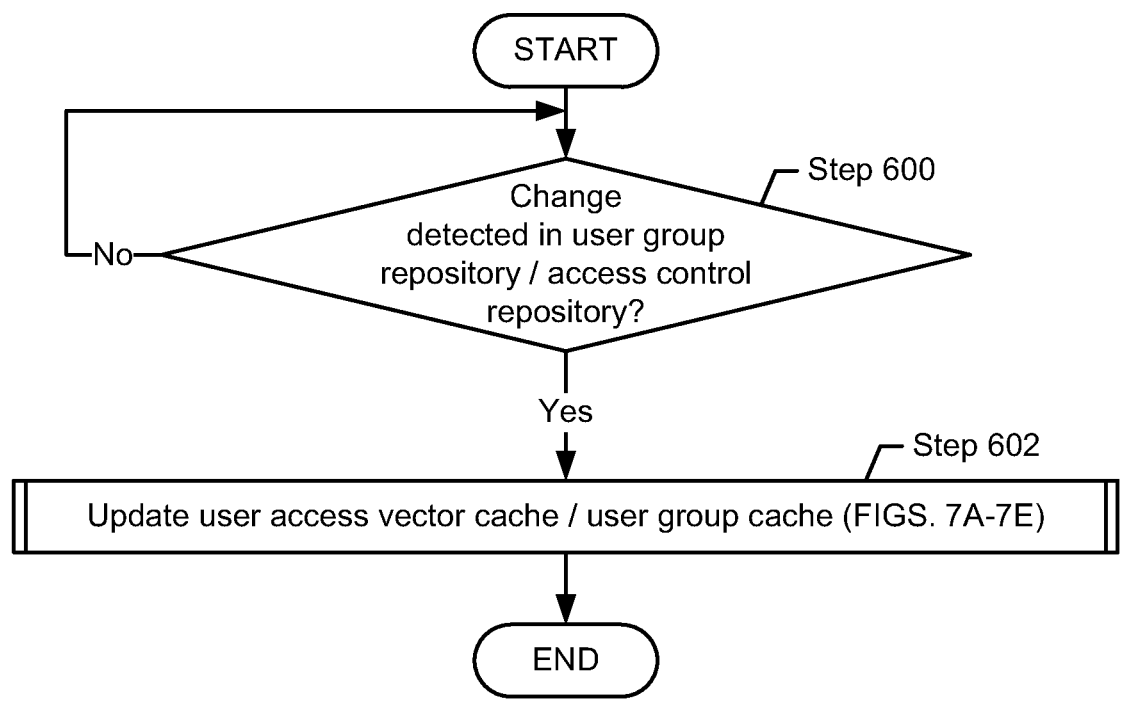
FIG. 6 shows a method for updating the user access vector cache and/or the user group cache, in accordance with one or more embodiments of the technology.

FIG. 6 shows a method for updating the user access vector cache and/or the user group cache, in accordance with one or more embodiments of the technology. An update of the user access vector cache and/or the user group cache may become necessary whenever a change is made to the access control repository and/or to the user group repository. Such changes may be detected, for example, by a crawler when indexing one or more of the repositories. Changes that may result in the execution of the method shown in FIG. 6 include, but are not limited to an addition or removal of users and/or groups to/from an access control list in the access control repository, a change of a permission level, and an addition/removal of an access control list. Further, changes that may result in the execution of the method shown in FIG. 6 may also include an addition or removal of users or groups to/from a group.

In Step 600, a determination is made about whether a change has occurred in the user group repository and/or in the access control repository. Changes to the access control repository and/or the user group repository may be detected by comparing the current state of the repositories to earlier states of the repositories. Such a comparison may reveal, for example, that a particular user/group was added/removed. As a result of the detected change, Step 602 may be executed.

In Step 602, the access vector cache and/or user group cache is updated. Depending on the type change to the access control repository and/or user group repository, one of the methods of FIGS. 7A-7E is executed, as described below.

Figure 7A:
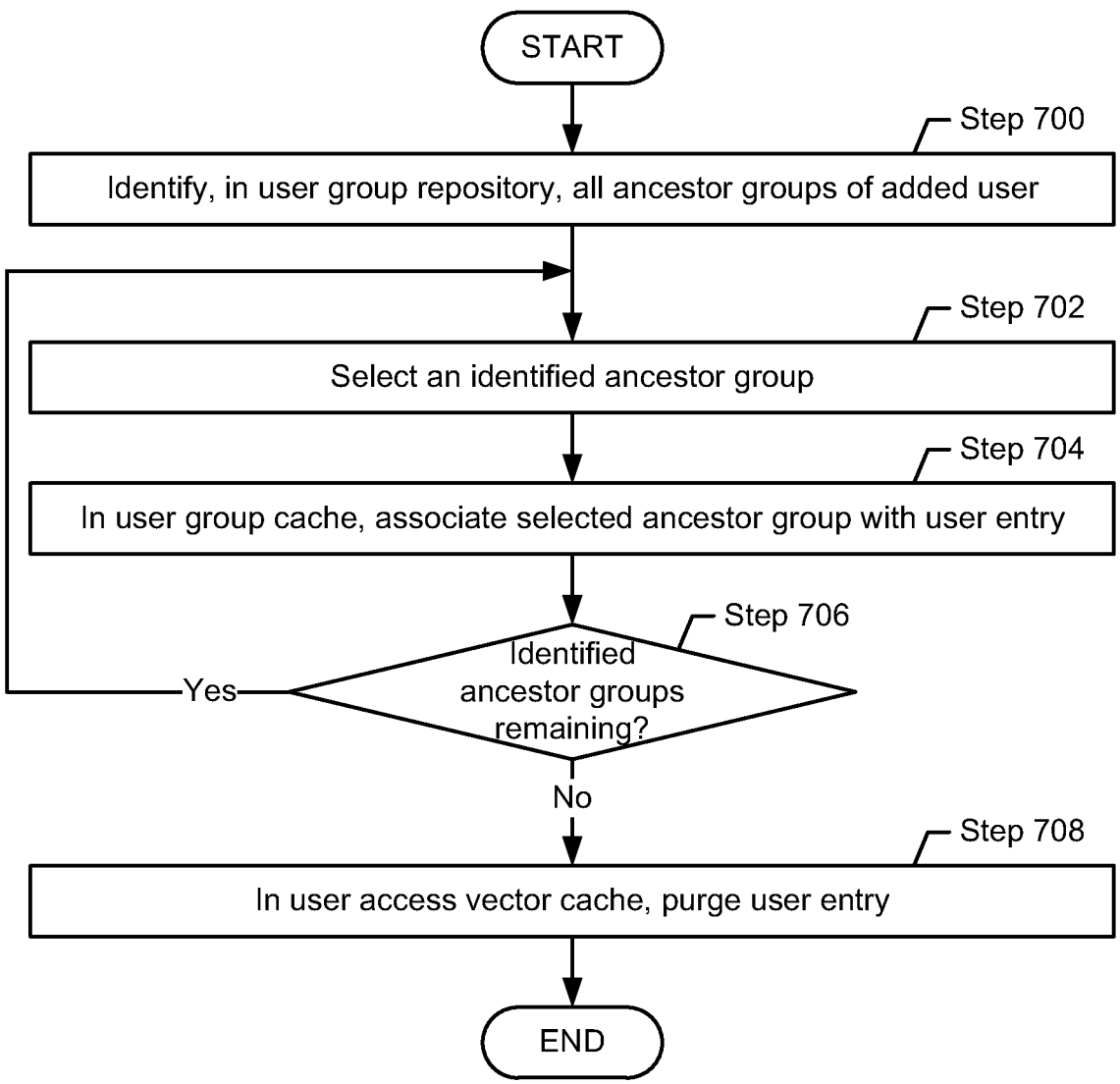
FIG. 7A shows a method for updating the user access vector cache and/or the user group cache in response to the addition of a user to a group, in the user group repository, in accordance with one or more embodiments of the technology.

FIG. 7A shows a method for updating the user access vector cache and/or the user group cache in response to the addition, in the user group repository, of a user to a group, in accordance with one or more embodiments of the technology.

Turning to FIG. 7A, in Step 700, all ancestor groups (e.g., parent and grandparent groups) are identified for the user that was added to a group. The identification may be performed as previously described in FIG. 4.

In Step 702, one of the ancestor groups is selected. Ancestor groups may be selected, for example, in alphabetical order, or in any other order. In Step 704, in the user group cache, the selected ancestor group is associated with the user entry corresponding to the added user.

In Step 706, a determination is made about whether other ancestor groups were identified in Step 700. If so, Steps 702-704 may be repeated for these ancestor groups.

In Step 708, the user entry for the added user is purged in the access vector cache. The user entry may be entirely removed. The purging is performed because, as a result of the changed group membership, the permission level of the user may have changed. Removal of the user entry from the access vector cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or updated user entry may be generated immediately after deletion from the access vector cache, or at the time when a document search requires the entry.

Figure 7B:
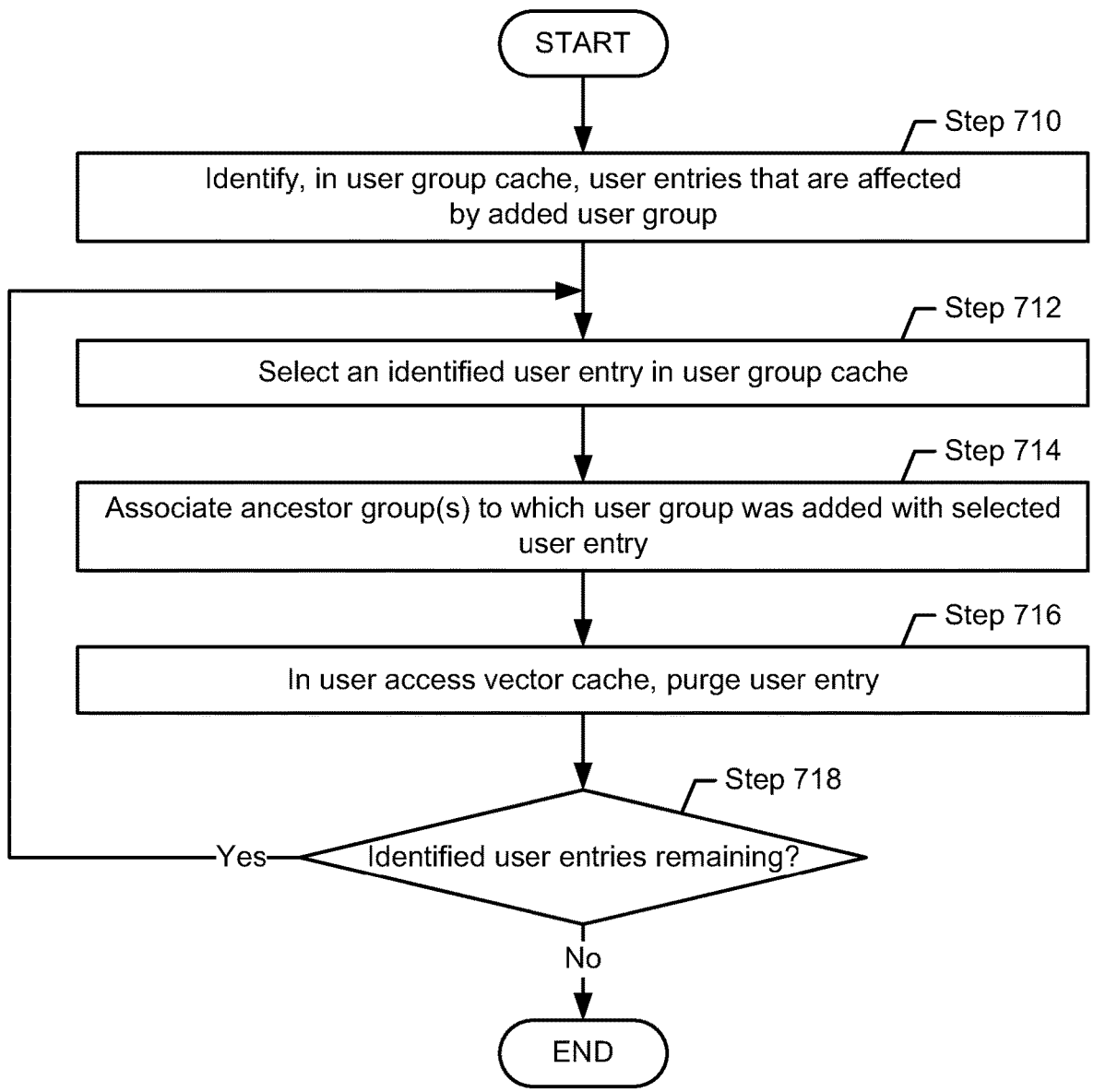
FIG. 7B shows a method for updating the user access vector cache and/or the user group cache in response to the addition of a group, in the user group repository, in accordance with one or more embodiments of the technology.

FIG. 7B shows a method for updating the user access vector cache and/or the user group cache in response to the addition of a group, e.g., to another group, in the user group repository, in accordance with one or more embodiments of the technology.

Turning to FIG. 7B, in Step 710, all user entries that are affected by the added group to the group cache are identified. Specifically, for each user in the user group cache, all associated groups are examined to determine whether the examined groups include the group that was added to another group.

In Step 712, one of the affected user entries is selected. User entries may be selected, for example, based on the order of the user entries in the user group cache, or in any other order.

In Step 714, in the group cache, the ancestor group(s) to which the group was added is/are associated with the user entry. Consider, for example, a user C that initially is a member of group C only (i.e., group C is the only ancestor group of user C). Further, assume that a group A is updated to include group C. As a result, group A and group C are ancestor groups of user C. Thus, group A needs to be associated with the user entry for user C, in the user group cache.

In Step 716, the user entry for the added user is purged, in the user access vector cache. The user entry may be entirely removed. The purging is performed because, as a result of the changed group membership, the permission level of the user may have changed. Removal of the user entry from the user access vector cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or revised user entry may be generated immediately after deletion from the user access vector cache, or at the time when a document search requires the entry.

In Step 718, a determination is made about whether other affected user entries are remaining. If so, Steps 712-716 may be repeated for these user entries.

Figure 7C:
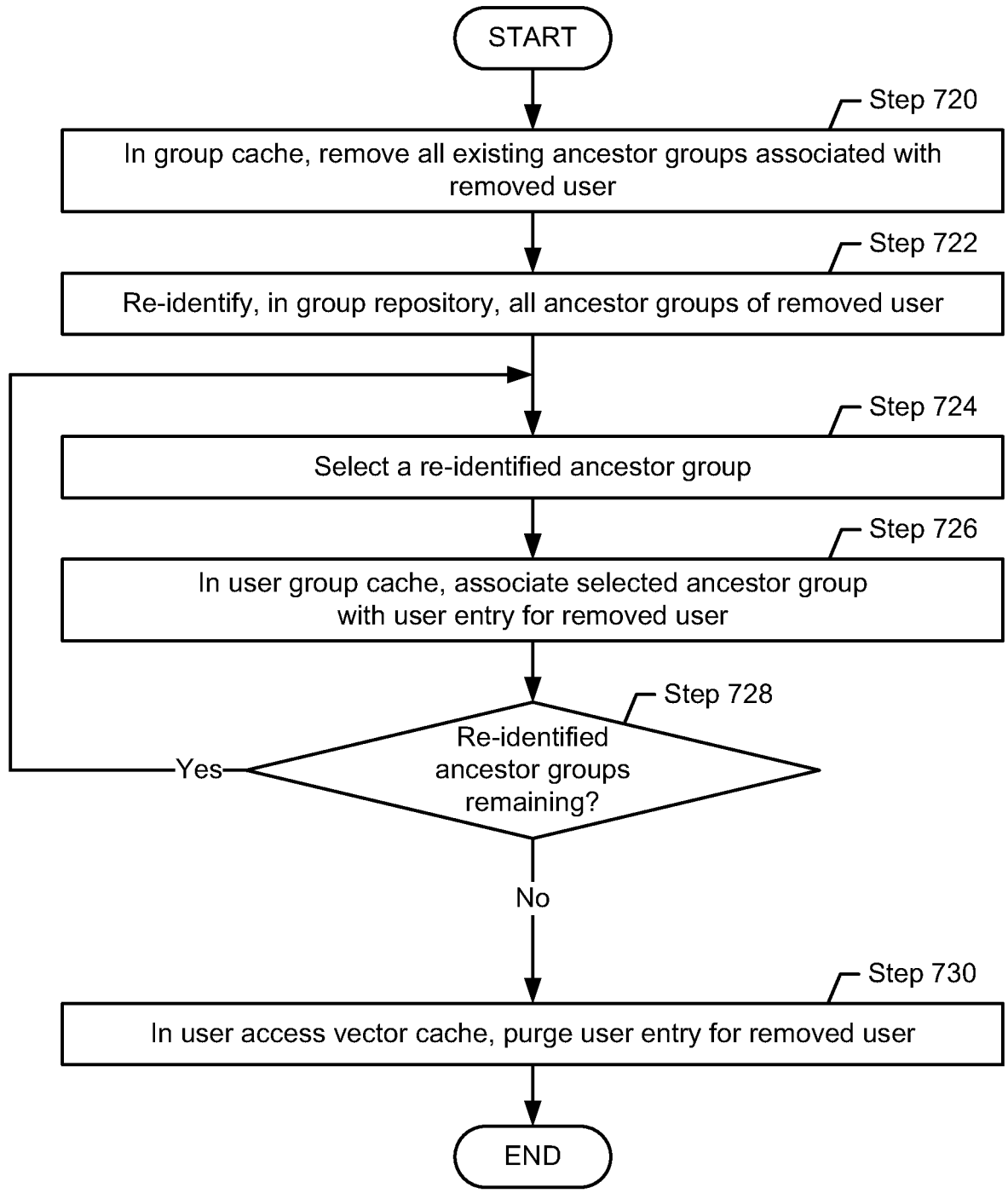
FIG. 7C shows a method for updating the user access vector cache and/or the user group cache in response to the removal of a user from a group, in the user group repository, in accordance with one or more embodiments of the technology.

FIG. 7C shows a method for updating the user access vector cache and/or the user group cache in response to the removal of a user from a group, in the user group repository, in accordance with one or more embodiments of the technology.

Turning to FIG. 7C, in Step 720, the association of all ancestor groups (e.g., parent groups, grandparent groups, etc.) are removed for the user entry.

In Step 722, all ancestor groups are re-identified for the user that was removed from the group. The re-identification may be performed, for example, as previously described in FIG. 4.

In Step 724, one of the re-identified ancestor groups is selected. An ancestor group may be selected, for example, based on the order of the ancestor groups in the user group cache, or in any other order.

In Step 726, the selected ancestor group is associated with the user, in the group cache.

In Step 728, a determination is made about whether other ancestor groups were identified in Step 722. If so, Steps 724-726 may be repeated for these ancestor groups.

In Step 730, the user entry for the user that was removed from the user group is purged, in the user access vector cache. The user entry may be entirely removed. The purging is performed because, as a result of the changed group membership, the permission level of the user may have changed. Removal of the user entry from the user access vector cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or revised entry may be generated immediately after deletion from the user access vector cache, or at the time when a document search requires the entry.

Figure 7D:
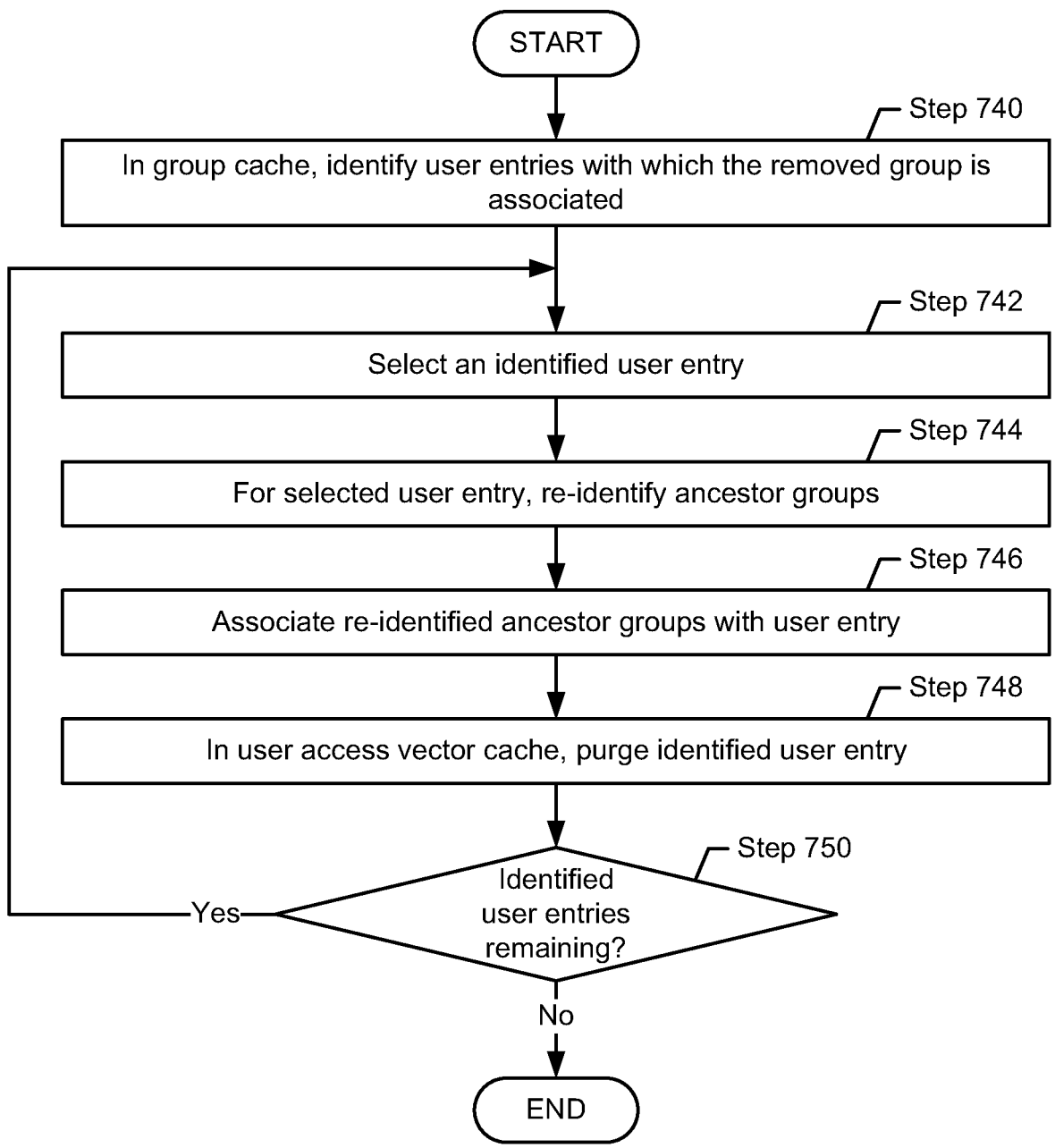
FIG. 7D shows a method for updating the user access vector cache and/or the user group cache in response to the removal of a group, in the user group repository, in accordance with one or more embodiments of the technology.

FIG. 7D shows a method for updating the user access vector cache and/or the user group cache in response to the removal of a group, in the user group repository, in accordance with one or more embodiments of the technology.

Turning to FIG. 7D, in Step 740, all user entries, in the user group cache, with which the removed group is associated, are identified In Step 742, one of the identified user entries is selected. A user entry may be selected, for example, based on the order of the user entries in the user group cache, or in any other order.

In Step 744, the ancestor groups for the user are re-identified. The re-identification may be performed as described in FIG. 4.

In Step 746, the re-identified ancestor groups are associated with the user, in the user group cache.

In Step 748, the user entry in the user access vector cache is purged. The user entry may be entirely removed. The purging is performed because, as a result of the changed group membership, the permission level of the user may have changed. Removal of the user entry from the user access vector cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or revised user entry may be generated immediately after deletion from the user access vector cache, or at the time when a document search requires the entry.

In Step 750, a determination is made about whether other user entries that are affected by the removed group, are remaining. If so, Steps 742-748 may be repeated for these user entries.

Figure 7E:
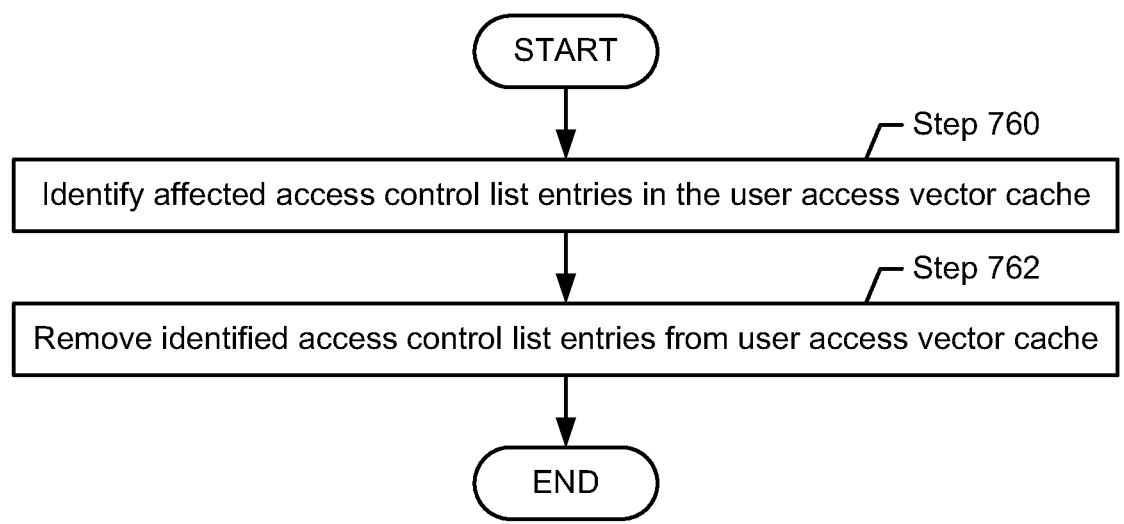
FIG. 7E shows a method for updating the user access vector cache in response to a change in the access control repository, in accordance with one or more embodiments of the technology.

FIG. 7E shows a method for updating the user access vector cache in response to a change in the access control repository, in accordance with one or more embodiments of the technology. The change in the access control repository may be any change, including but not limited to an addition or removal of users and/or groups to/from an access control list in the access control repository, a change of a permission level, and an addition/removal of an access control list.

Turning to FIG. 7E, in Step 760, the affected access control list entries made for users, in the user access vector cache, are identified. Specifically, if a change is registered in a particular access control list in the access control repository, all instances of this access control list are identified in the user access vector cache. Any change (addition or removal of users or groups) may require the iteration through the entire user access vector cache in order to identify the entries that may need to be adjusted. Consider a scenario in which an access control list 2 is affected by changes. Further assume that the exemplary user access vector cache of FIG. 8A is to be updated after detection of the change. As a result, all instances of "ac12" under "userA", "userB" and "userC" are identified as affected, in the exemplary user access vector cache of FIG. 8A.

In Step 762, the identified access control list entries are removed from the user access vector cache.

The following use case scenarios are intended to provide examples of the methods for updating the access vector cache and the user group cache. The methods described by FIGS. 2-7E are not limited to the subsequently described use cases.

Use Case I: Update of the User Group Cache in Response to the Addition of a User to a User Group (as Described in FIG. 7A)

Consider a scenario in which the user group cache includes entries as shown in FIG. 8B. FIG. 8B graphically depicts the hierarchical organization of the users in groups, but also the representation used for storing group membership in the format of the user group cache. Assume that, starting from the configuration shown in FIG. 8B, the group repository is updated such that group B includes user C (see hierarchical group organization chart of FIG. 9A). During the execution of the method of FIG. 7A, the ancestor groups of user C are identified. By inspection of the user group repository, it is determined that the ancestor groups of user C are groups A, B, and C, as can also be seen in the hierarchical group organization chart of FIG. 9A. Accordingly, all of these ancestor groups are associated with user C, in the user group cache, as shown in the updated user group cache of FIG. 9A. In the user access vector cache, the entry for user C is deleted.

Use Case II: Update of the User Group Cache in Response to the Addition of a User Group to Another User Group (as Described in FIG. 7B)

Consider, again, the scenario in which the user group cache includes entries as shown in FIG. 8B. Further, assume that, starting from the configuration shown in FIG. 8B, the group repository is updated such that group A includes group C (see hierarchical group organization chart of FIG. 9B). During the execution of the method of FIG. 7B, the user entries that are affected by the added group are identified by locating the user entries for which group C is considered an associated group. Inspection of the user group cache of FIG. 8B shows that only user C is affected. The ancestor group to which group C was added is group A. Accordingly, an association of group A with user C is added to the user group cache. In the user access vector cache, the entry for user C is deleted.

Use Case III: Update of the User Group Cache in Response to the Removal of a User from a User Group (as Described in FIG. 7C)

Figure 9A:
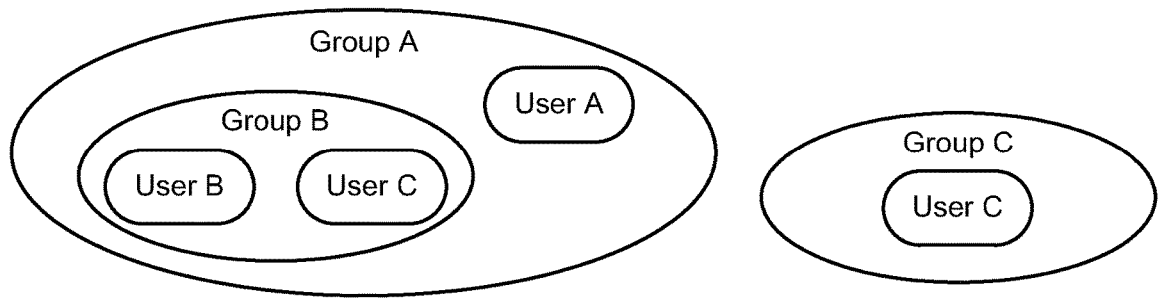
FIGS. 9A-9D show the updating of user group caches, in accordance with one or more embodiments of the technology.
Figure 9B:
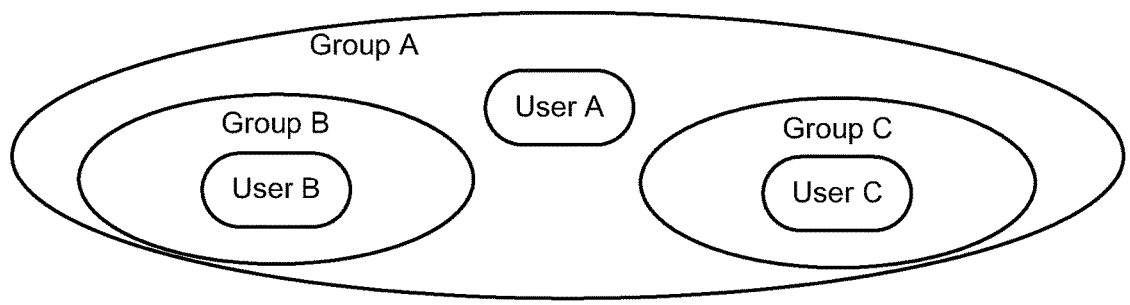
Figure 9C:
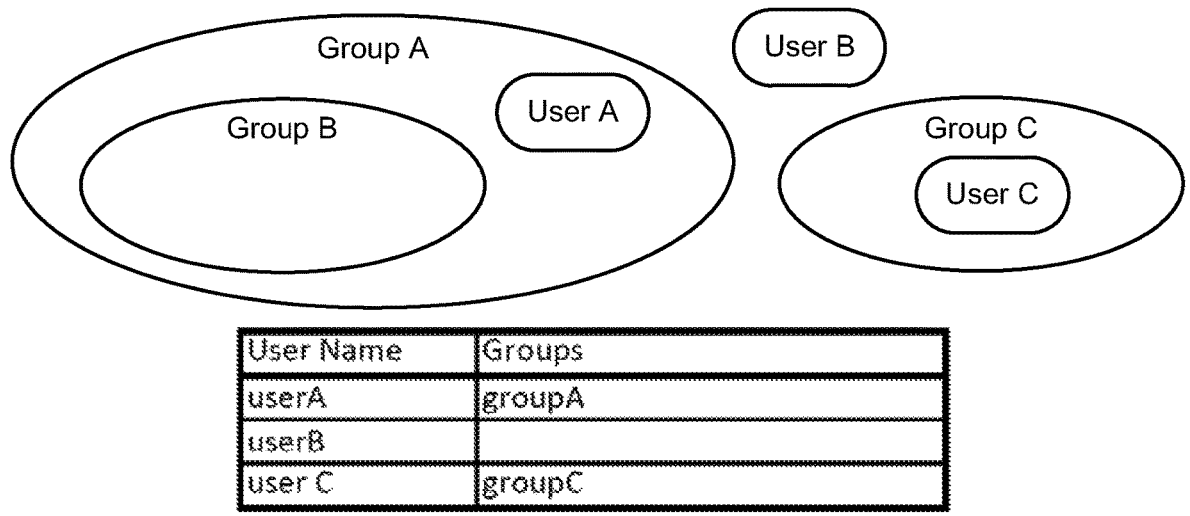

Consider, again, the scenario in which the user group cache includes entries as shown in FIG. 8B. Further, assume that, starting from the configuration shown in FIG. 8B, the group repository is updated such that group B does no longer include user B (see hierarchical group organization chart of FIG. 9C). During the execution of the method of FIG. 7C, the association of all ancestor groups of user B is removed. Next, all ancestor groups of user B are identified. However, user B no longer has any ancestor groups. The user group cache is updated accordingly, as shown in FIG. 9C. In the user access vector cache, the entry for user B is deleted.

Use Case IV: Update of the User Group Cache in Response to the Removal of a User Group from Another User Group (as Described in FIG. 7D)

Figure 9D:
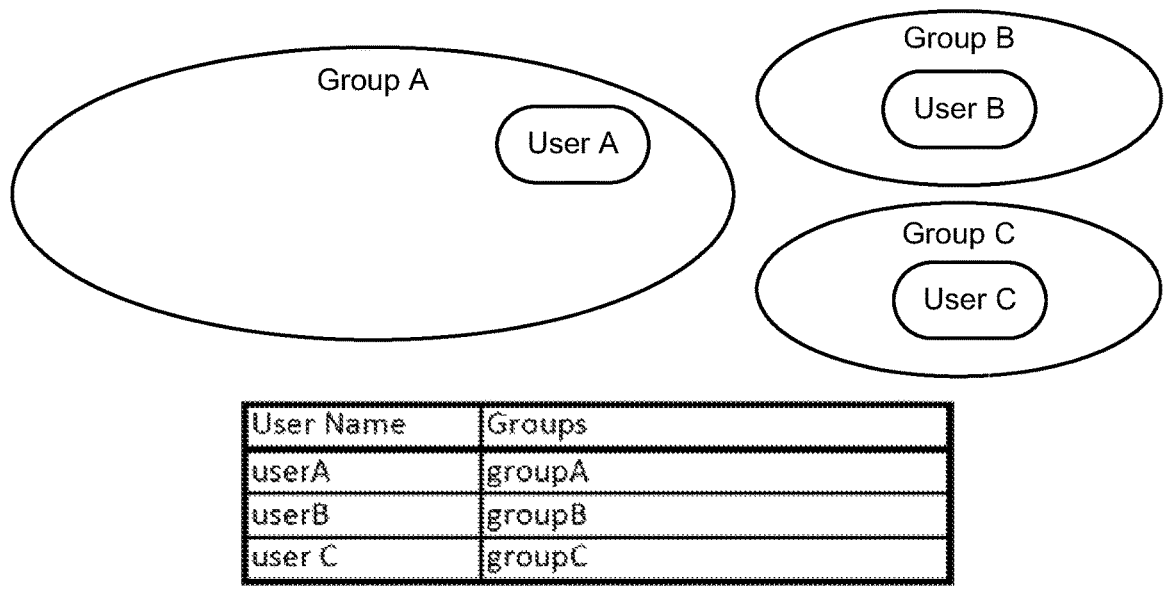

Consider, again, the scenario in which the user group cache includes entries as shown in FIG. 8B. Further, assume that, starting from the configuration shown in FIG. 8B, the group repository is updated such that group B is removed from group A (see hierarchical group organization chart of FIG. 9D). During the execution of the method of FIG. 7D, the user entries that include the removed group are identified. It is found that group B is associated only with user B. Accordingly, the ancestor groups are re-identified for user B. From the user group repository, it is found that the only ancestor group for user B now is group B. The user B entry in the user group cache is updated accordingly, as shown in FIG. 9D. In the user access vector cache, the entry for user B is deleted.

Figure 10:
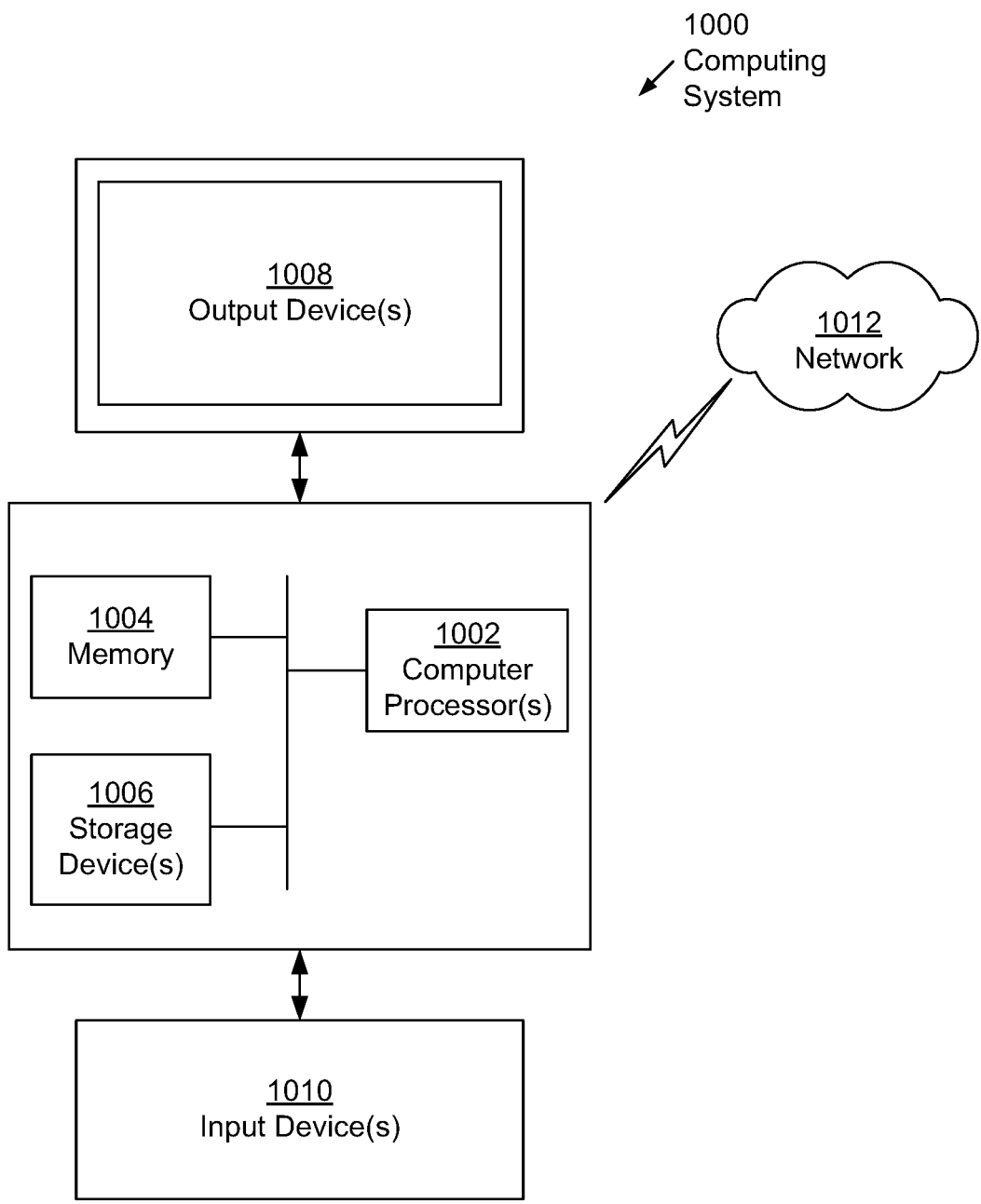
FIG. 10 shows a computing system in accordance with one or more embodiments of the technology.

Embodiments of the technology may be implemented on a computing system. Any combination of mobile, desktop, server, embedded, or other types of hardware may be used. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012)

(e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (1000) may be located at a remote location and connected to the other elements over a network (1012). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for maintaining user groups, comprising:
    making, by a document management service, a first determination that a change occurred in a user group repository located on a repository server, wherein the first determination is based on a user being removed from a first user group;
    performing an update, based on the first determination, to a user group cache located on the document management service, comprising:
        removing, from a user cache entry of the user group cache, a plurality of user groups associated with the user, wherein the plurality of user groups comprises the first user group and a second user group; and
        modifying, after the update, a user access vector cache located on the document management service, wherein modifying the user access vector cache is based on a document search query that requests the user access vector cache, and wherein the user access vector cache comprises user access vectors which specify access control lists that are associated with the user, wherein modifying the user access vector cache comprises:
            determining that a first access control list of a user access entry of the user access vector cache specifies the first user group; and
            removing, based on the first access control list specifying the first user group, the first access control list from the user access entry;
            determining that the first access control list does not specify the second user group, wherein removing the first access control list from the user access entry is further based on the first access control not specifying the second user group;
        making an identification, in the user group repository, that the user is a member of the second user group; and
        associating, based on the identification, the second user group with the user cache entry.

2. The method of claim 1, wherein modifying the user access vector cache comprises:
    removing a user access entry from the user access vector cache;
    generating, based on the removing, a new user access entry; and
    adding, to the user access vector cache, the new user access entry.

3. The method of claim 2, wherein generating the new user access entry comprises:
    associating a first access control list with the new user access entry, wherein the first access control list specifies the second user group.

4. The method of claim 1, wherein modifying the user access vector cache further comprises:
    making a third determination that a second access control list of the user access entry specifies the second user group; and
    leaving, based on the third determination, the second access control list in the user access entry.

5. The method of claim 1, wherein modifying the user access vector cache is based on the update.

6. A non-transitory computer readable medium comprising instructions which, when executed by a computer processor, enables the computer processor to perform a method for maintaining user groups, the method comprising:
    making, by a document management service, a first determination that a change occurred in a user group repository located on a repository server, wherein the first determination is based on a user being removed from a first user group;
    performing an update, based on the first determination, to a user group cache located on the document management service, comprising:
        removing, from a user cache entry of the user group cache, a plurality of user groups associated with the user, wherein the plurality of user groups comprises the first user group and a second user group; and
        modifying, after the update, a user access vector cache located on the document management service, wherein modifying the user access vector cache is based on a document search query that requests the user access vector cache, and wherein the user access vector cache comprises user access vectors which specify access control lists that are associated with the user, wherein modifying the user access vector cache comprises:
            determining that a first access control list of a user access entry of the user access vector cache specifies the first user group; and
            removing, based on the first access control list specifying the first user group, the first access control list from the user access entry;

determining that the first access control list does not specify the second user group, wherein removing the first access control list from the user access entry is further based on the first access control not specifying the second user group;

making an identification, in the user group repository, that the user is a member of the second user group; and associating, based on the identification, the second user group with the user cache entry.

7. The non-transitory computer readable medium of claim 6, wherein modifying the user access vector cache comprises:

removing a user access entry from the user access vector cache;

generating, based on the removing, a new user access entry; and adding, to the user access vector cache, the new user access entry.

8. The non-transitory computer readable medium of claim 7, wherein generating the new user access entry comprises:

associating a first access control list with the new user access entry, wherein the first access control list specifies the second user group.

9. The non-transitory computer readable medium of claim 6, wherein modifying the user access vector cache further comprises:

making a third determination that a second access control list of the user access entry specifies the second user group; and leaving, based on the third determination, the second access control list in the user access entry.

10. The non-transitory computer readable medium of claim 6, wherein modifying the user access vector cache is based on the update.

11. A method for maintaining user groups, comprising:

making, by a document management service, a first determination that a change occurred in a user group repository located on a repository server, wherein the first determination is based on a user being removed from a first user group;

performing an update, based on the first determination, to a user group cache located on the document management service, comprising:

removing, from a user cache entry of the user group cache, a plurality of user groups associated with the user, wherein the plurality of user groups comprises the first user group and a second user group; and modifying, after the update, a user access vector cache located on the document management service, wherein modifying the user access vector cache is based on a document search query that requests the user access vector cache, and wherein the user access vector cache comprises user access vectors which specify access control lists that are associated with the user, wherein modifying the user access vector cache comprises:

determining that a first access control list of a user access entry of the user access vector cache specifies the first user group; and removing, based on the first access control list specifying the first user group, the first access control list from the user access entry;

determining that a second access control list of the user access entry specifies the second user group;

leaving, based on the second access control list specifying the second user group, the second access control list in the user access entry making an identification, in the user group repository, that the user is a member of the second user group; and associating, based on the identification, the second user group with the user cache entry.

\* \* \* \* \*